US005652927A

United States Patent [19]
McIntyre

[11] Patent Number: 5,652,927
[45] Date of Patent: Jul. 29, 1997

[54] TRANSMITTING INFORMATION BETWEEN A COMPUTER AND AN AUTO FOCUS CAMERA

[75] Inventor: Dale F. McIntyre, Honeoye Falls, N.Y.

[73] Assignee: Eastman Kodak Company, Rochester, N.Y.

[21] Appl. No.: 731,352

[22] Filed: Oct. 11, 1996

[51] Int. Cl.$^6$ ................................. G03B 13/36
[52] U.S. Cl. ........................................ 396/108
[58] Field of Search ........................ 396/106, 108, 396/300; 356/3.01–3.07

[56] References Cited

U.S. PATENT DOCUMENTS

| | | | |
|---|---|---|---|
| 4,740,806 | 4/1988 | Kuisha | 354/403 |
| 5,055,664 | 10/1991 | Ryczek | 250/201.4 |
| 5,294,802 | 3/1994 | Kunishige | 250/561 |
| 5,500,728 | 3/1996 | Nishimoto | 356/3.03 |
| 5,546,156 | 8/1996 | McIntyre | 396/108 |
| 5,589,905 | 12/1996 | McIntyre | 396/106 X |

*Primary Examiner*—W. B. Perkey
*Attorney, Agent, or Firm*—Raymond L. Owens

[57] ABSTRACT

In a camera adapted to receive and transmit information by means of radiation beams to and from a computer and having an auto focus system and including means for providing a radiation beam and radiation beam sensor means and being effective in a first mode for transmitting a radiation beam, reflecting it off of a subject and the beam sensor means being adapted to receive such reflected radiation beam from the subject for effectively determining the subject distance for auto focus of the camera and, in a second mode, after aligning the camera radiation beam with the computer for determining the distance between the camera and the computer and including means for adjusting the intensity of the camera radiation beam as a function of the distance between the camera and the computer and directly communicating data between the camera and the computer.

11 Claims, 4 Drawing Sheets

TRANSMITTING INFORMATION BETWEEN A COMPUTER AND AN AUTO FOCUS CAMERA

CROSS REFERENCE TO RELATED APPLICATION

The present invention is related to U.S. patent application Ser. No. 08/268,691 filed Jun. 29, 1994, entitled "A Light Beam Communication Method and System for Linking a Camera and a Computer", to Mauro et al assigned to the assignee of the present invention. The disclosure of this related application is incorporated herein by reference.

FIELD OF THE INVENTION

The present invention relates to cameras which receive and transmit information to computers.

BACKGROUND OF THE INVENTION

Auto focus systems are well understood in the art and are used by electronic cameras which capture electronic images of a subject. In one effective auto focus system, a position determining device such as a PSD (position sensing device) is used to measure the distance from a subject to the camera. This type of device is well known in the art and forms a part of an auto focus system which includes an infrared-emitting diode which projects a beam on the subject and reflects the beam back onto the position determining device. A distance measuring apparatus then computes the distance between the subject and the camera. This type of arrangement is well known in the art and for a more detailed description of a measuring apparatus which uses a PSD, see U.S. Pat. No. 5,294,802 issued Mar. 15, 1994 to Kunishige. See also U.S. Pat. Nos. 4,740,806 issued Apr. 26, 1988 to Kuisha and 5,055,664 issued Oct. 8, 1991 to Ryczek.

Turning to FIG. 1 shows a simplified version of such a prior art auto focus system. The system includes an auto focus emitter 12, usually in the form of an infrared light emitting diode (LED) which emits light (which is usually frequency modulated). This light is substantially collimated by a lens 14 and projected on a subject S whose image is to be captured. The light beam reflects off of the subject S is collected by a lens 16 which causes the beam to be focused onto a PSD 18 or, alternatively, an array of light emitting diodes. The position of the beam focused on the PSD 18 will be a function of the distance of the subject from the camera. To measure this distance, an auto focus control integrated circuit (IC) 20 receives two signals from the PSD 18, one from the top of the PSD 18 and one from the bottom of the PSD 18. The signals are labeled $I_1$ and $I_2$. The ratio of the signal levels is then calculated by the IC 20 and a distance signal is computed. Alternatively, the IC 20 by using a predetermined look-up table, can determine the distance of the subject from the camera. The distance signal is digitized in the IC 20 and applied to a central processing unit (CPU) 22. In order to adjust the position of a camera taking lens 24, shown as a block, the CPU 22 controls a standard focusing unit 26 which adjusts the focus position of the taking lens 24. The taking lens 24, of course, focuses an image of a subject typically on an area image sensor, which is not shown for clarity of illustration.

An electrically erasable programmable read-only memory 28 (EEPROM) is shown coupled to the CPU 22 and is a repository for a number of programs used to control the overall camera functions and transmission of data from within the camera.

In the above identified Mauro et al application, the radiation beam emitted by the auto focus emitter is also used to communicate information to a computer unit. The camera is effective in two separate modes of operation. In the first, the auto focus arrangement is used in determining the distance of a subject from the camera and for adjusting the focus position of the taking lens appropriate for the determined distance. In the second mode of operation, the same light beam which illuminates the subject, is used to communicate information directly to the computer.

One problem with this arrangement is that the power source for the camera is provided by batteries and it puts an additional drain on these batteries to use them, not only for auto focus but also for information communication.

When the information communication involves the transmission of an image data file, the auto focus system can exceed its designed life if operated at full power. Typical image data files can contain several hundred thousand bytes of information where each data byte equals eight serial data bits or pulses of light.

Another problem with this arrangement is the inability of the user to determine the probability of a successful transmission without trying said transmission causing further unnecessary drain on camera batteries.

SUMMARY OF THE INVENTION

It is an object of the present invention to minimize the amount of power needed to operate a camera when it is directly communicating with the computer.

This object is achieved a camera having an auto focus system adapted to receive and transmit information from a computer, the improvement comprising:

a) means for measuring ambient light level and to produce a signal representative of the effect on information transmission from such ambient light level; and b) means responsive to the signal for predicting the likelihood of information transmission success.

It is a further object of the invention to maximize the probability of a successful data transmission by notifying a user of the state of environmental transmission conditions that adversely affect transmission quality.

The further object is achieved by a camera adapted to receive and transmit information by means of radiation beams to and from a computer and having an auto focus system and including means for providing a radiation beam and radiation beam sensor means and being effective in a first mode for transmitting a radiation beam, reflecting it off of a subject and the beam sensor means being adapted to receive such reflected radiation beam from the subject for effectively determining the subject distance for auto focus of the camera and, in a second mode, after aligning the camera radiation beam with the computer for determining the distance between the camera and the computer and including means for adjusting the intensity of the camera radiation beam as a function of the distance between the camera and the computer and directly communicating data between the camera and the computer.

ADVANTAGES

It is an advantage of the present invention that power consumption can be significantly reduced when an auto focus camera is transmitting information by means of a radiation beam. This is accomplished by making use of an auto focus system.

In accordance with the present invention, the power consumption of the camera's power supply, typically batteries, can be conserved providing a longer operator usage without needing to replace batteries.

It is a feature of the present invention that the camera power usage is controlled not only as a function of the distance of the camera to the computer, but also as a function of the ambient light level.

It is a feature of the present invention that a camera operator can minimize the number of failed transmission attempts when the environmental transmission conditions are adverse.

DETAILED DESCRIPTION OF THE INVENTION

Figure 1:
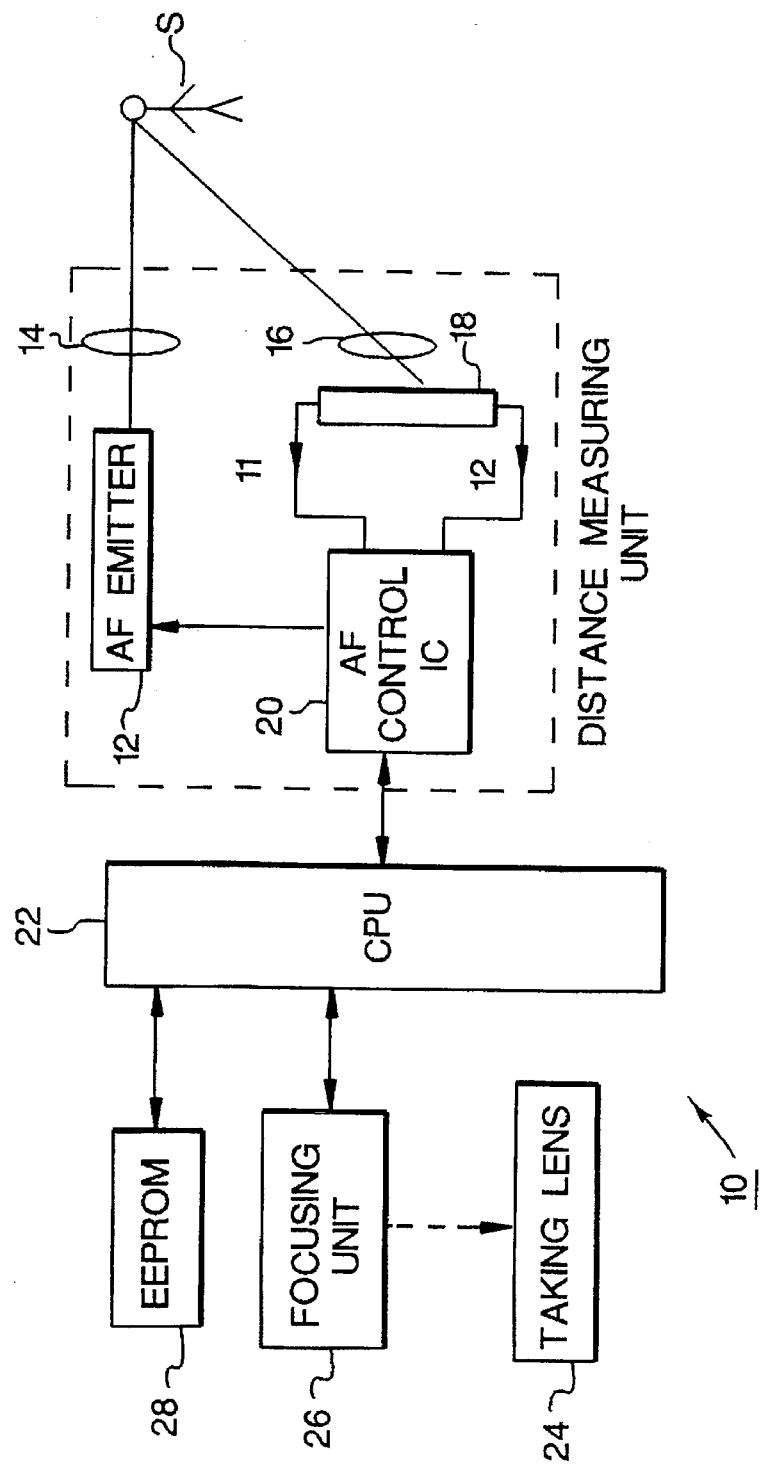
FIG. 1 is a schematic block diagram of a prior art camera auto focus system.
Figure 2:
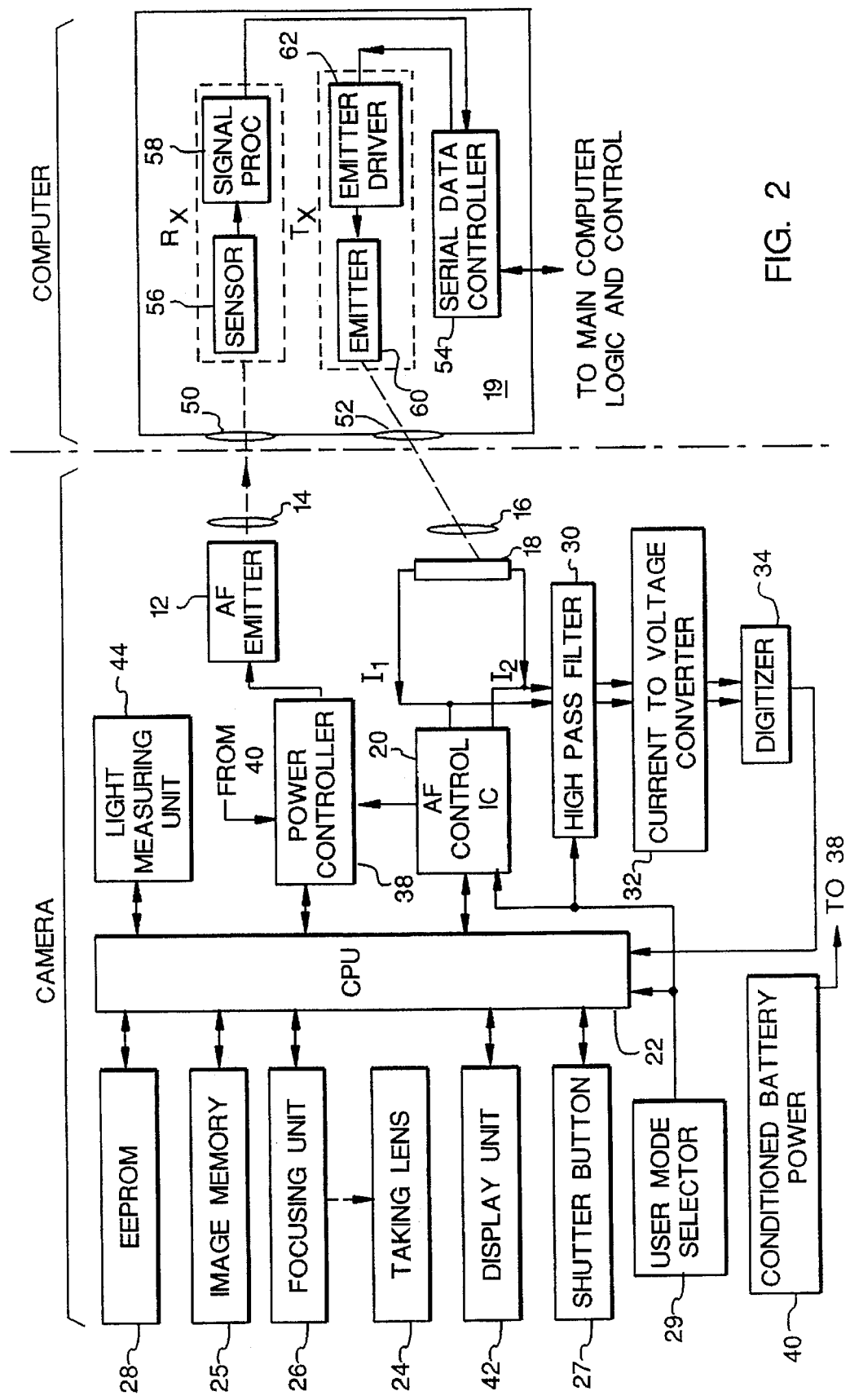
FIG. 2 is a schematic block diagram of a camera having an auto focus system and a computer and shows how the camera can directly communicate with the computer in accordance with the present invention.

Turning now to FIG. 2 which shows a schematic block diagram of a camera having an auto focus arrangement and which can directly communicate with a computer 19. Where parts in the auto focus system correspond to those in FIG. 1, the same numbers will be used and, since their operations are the same as in FIG. 1, their operations need not be described further.

In the camera, the two current signals $I_1$ and $I_2$ are not only applied to the auto focus control IC 20, but also can be selectively applied to a high pass filter 30. The purpose of this filter is to eliminate low frequency noise such as, for example, 50 or 60 Hz noise (and their respective higher order harmonics) used to drive fluorescent lights. More particularly, a user mode selector 29 provides an input to the high pass filter 30 and the IC 20, and selectively directs the currents $I_1$ and $I_2$ to the high pass filter 30 when the camera is to be in a mode of operation to permit communication with the computer 19.

Both of these signals are next applied to a standard current to voltage converter 32. These voltage signals are then applied to a digitizer 34. This digitizer 34 applies its signals to the central processing unit 22. As will be well understood by those skilled in the art, the EEPROM 28 can include a digital OR gate program which selects the higher of the two levels and uses it for further processing.

It will be appreciated by those skilled in the art that the effect of using the PSD 18 to receive the data from computer 19 causes the data stream from the computer 19 to be incident anywhere upon the PSD primarily as a function of the distance of the camera to the computer 19. Therefore, the data stream could be entirely present in the current signal $I_2$ and entirely absent from current signal $I_1$. The converse is also true. By converting both current signals $I_1$ and $I_2$ the CPU 22 can logically "OR" resultant digitized signals permitting the received beam to wander which could result from a hand held transmission.

When the camera is to communicate with the computer 19, the camera is aimed at the computer 19 and the CPU 22 calculates a standard distance signal representative of the distance from the camera to the computer 19. The CPU 22, in response to the distance signal which has previously been computed, calculates a control signal which is applied to a power controller 38 which adjusts the intensity of the beam of light provided by the auto focus emitter when in the data transmission mode. This signal is a function of the distance of the computer 19 from the camera. However, as will be shortly described, in a preferred embodiment, the ambient light level is also taken into consideration when computing the control signal. As will be apparent from the drawings, in a normal auto focus mode, the intensity of the beam produced by the emitter 12 is typically at a constant high power level. In accordance with the present invention, when communicating data, the beam intensity will be adjusted as will be described hereinafter. In this way, the power consumption of the camera's power supply, typically batteries, can be conserved providing a longer operator usage without operator intervention.

A conditioned battery power supply 40 includes at least one battery and conventional circuitry to provide needed voltage level signals to different elements of the camera. One of such signals is applied to a power controller 38. The power controller 38 includes circuitry for receiving a data signal from CPU 22 or an auto focus signal from auto focus control IC 20 for adjusting the current supplied to the auto focus emitter 12. Such power controller circuits will be understood to include a variable current supply which provides the current needed to drive the auto focus emitter 12. This variable current supply is controlled by the CPU 20 as will be well understood by those skilled in the art. By adjusting the amount of power supplied to the auto focus emitter 12 in the data transmission mode, power can be conserved.

A light measuring unit 44 includes a photo sensor and produces a signal which is received by the CPU 20 and is a function of the intensity of the ambient light level. This ambient light level signal, along with the distance signal, is used by the CPU 20 to compute the appropriate amount of current that the power controller 38 should supply to the auto focus emitter 12 as discussed above.

As shown in FIG. 2 there is an image memory 25. This memory is a random access memory (RAM) device type and holds image data and miscellaneous parameters relevant to the camera's operation as controlled by CPU 22.

Shutter button 27 will be understood to function in two stages as is well known in the art. In accordance with the present invention, CPU 22 will interpret these control signals in the data transmission mode indications that the operator is initiating a data transfer to the computer. The selection of which image to transfer further includes the user of display unit 42 under program control of CPU 22 which retrieves query messages from EEPROM 28. These messages can be in the form of text, icons or other communication signals. The operator using the shutter button in the first stage to sequence through query messages completes the interaction thus causing data to be transferred by using the shutter button in the second stage.

FIG. 2 shows a computer which, of course, is well understood in the art. As used throughout this specification, the term computer will be understood to include apparatus which is adapted to receive information from the camera and also transmit a signal to the camera. The computer includes a lens 50 which receives light from the auto focus emitter 12 and includes a receive transmission unit (Rx) which is shown to have an infrared receiving sensor 56 and a signal processing unit 58 which, of course, processes the data transmitted from the CPU 22. The auto focus emitter 12 receives signals from the CPU 22 via power controller 38 which causes it to pulse the light source to provide the information content of the data needed to be sent to the computer. The signal processing unit 58 in the computer receives this data and converts it into a more useable format and sends it to a serial data controller 54 which will be understood to include a memory. The serial data controller 54 can, of course, communicate this data to the main computer logic and control or to other devices for further processing. For example, if a picture data file is transmitted to the computer after processing this information can be sent to a printer or transmitted over a data communication line to a remote location.

The computer also includes a lens 52 which receives light from a non collimated light source shown as emitter 60 and this light is collected by the camera lens 16 and focused onto the PSD 18. In the transmitting unit (Tx) the emitter 60 is shown driven by an emitter driver 62 which, in turn, is under the control of the serial data controller 54.

Figure 3:
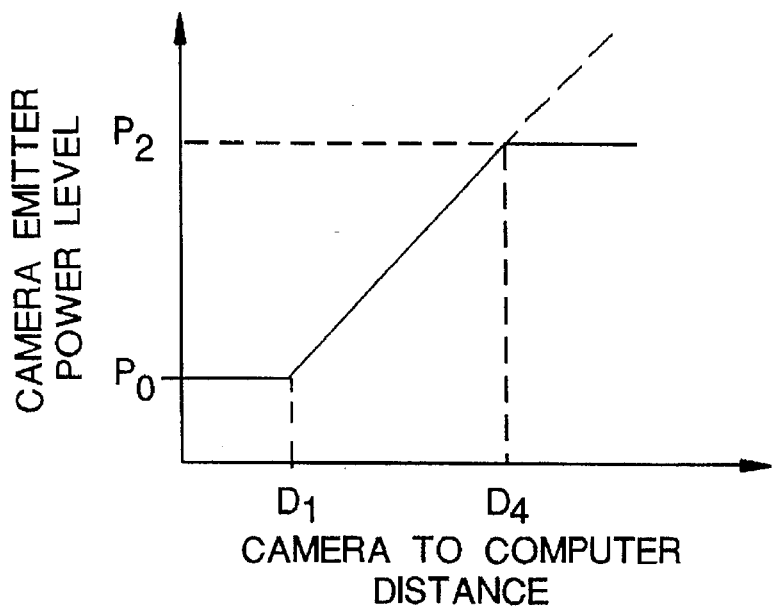
FIG. 3 is a graph showing typical camera emitter power level vs. camera to computer distance.

FIG. 3 shows a graph of a typical situation of camera emitter power level versus camera to computer distance. The graph shows the needed emitter power for the computer to effectively receive information for processing. As shown, there is a minimum power level when the camera is close to the computer, and a maximum power level after the camera has moved to a distance further from the computer. In between these two positions, the needed power level is a variable, shown here as a linear relationship for simplicity of illustration.

Figure 4:
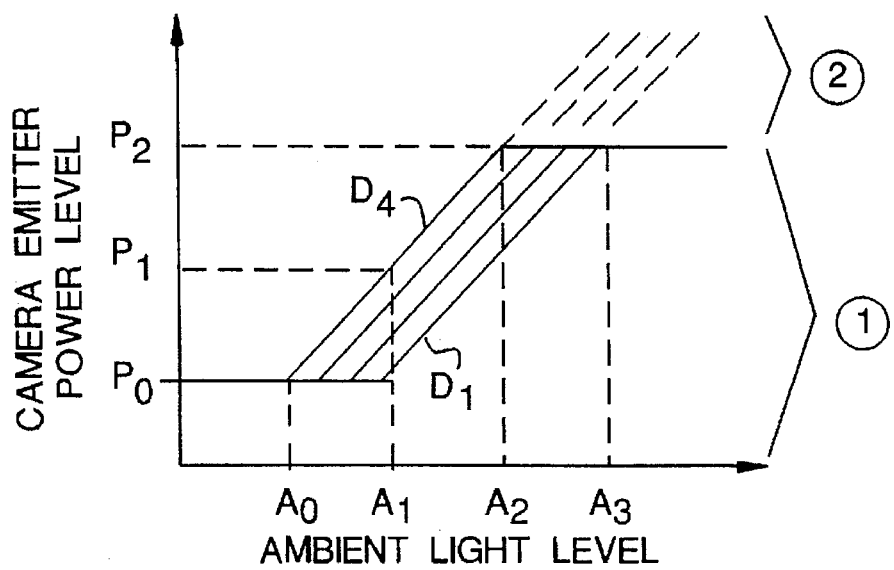
FIG. 4 is a graph showing typical camera emitter power level vs. ambient light.

FIG. 4 shows a similar relationship between the camera emitter power level, camera to computer distance and further includes an environmental condition—ambient light level. There is a minimum power level $P_0$ needed for a low ambient light level or a close camera to computer distance and a maximum power for a high ambient light level.

The effect of ambient light on data transmission can best be examined by fixing the camera to subject distance at distance $D_1$. In low ambient light such as a darkened room, the camera emitter power level can be maintained at its lowest level, $P_0$, until ambient light level $A_1$. If the ambient light is increased past level $A_1$, then power is increased to the emitter 12. It should be clear that if the camera is positioned further from the computer such as distance $D_4$, increased power is necessary at lower ambient light levels to ensure an accurate data transmission. For example, a power of $P_1$ is required at distance $D_4$ and ambient light level $A_1$ where a power of $P_0$ is required if the camera to computer distance equals $D_1$ (where $P_1 > P_0$ and $D_4 > D_1$) with a constant ambient light level $A_1$.

The CPU 22 has information corresponding to these curves available via EEPROM 28 and uses that information and the distance and ambient light level signals to compute the control signal as discussed above.

Figure 5:
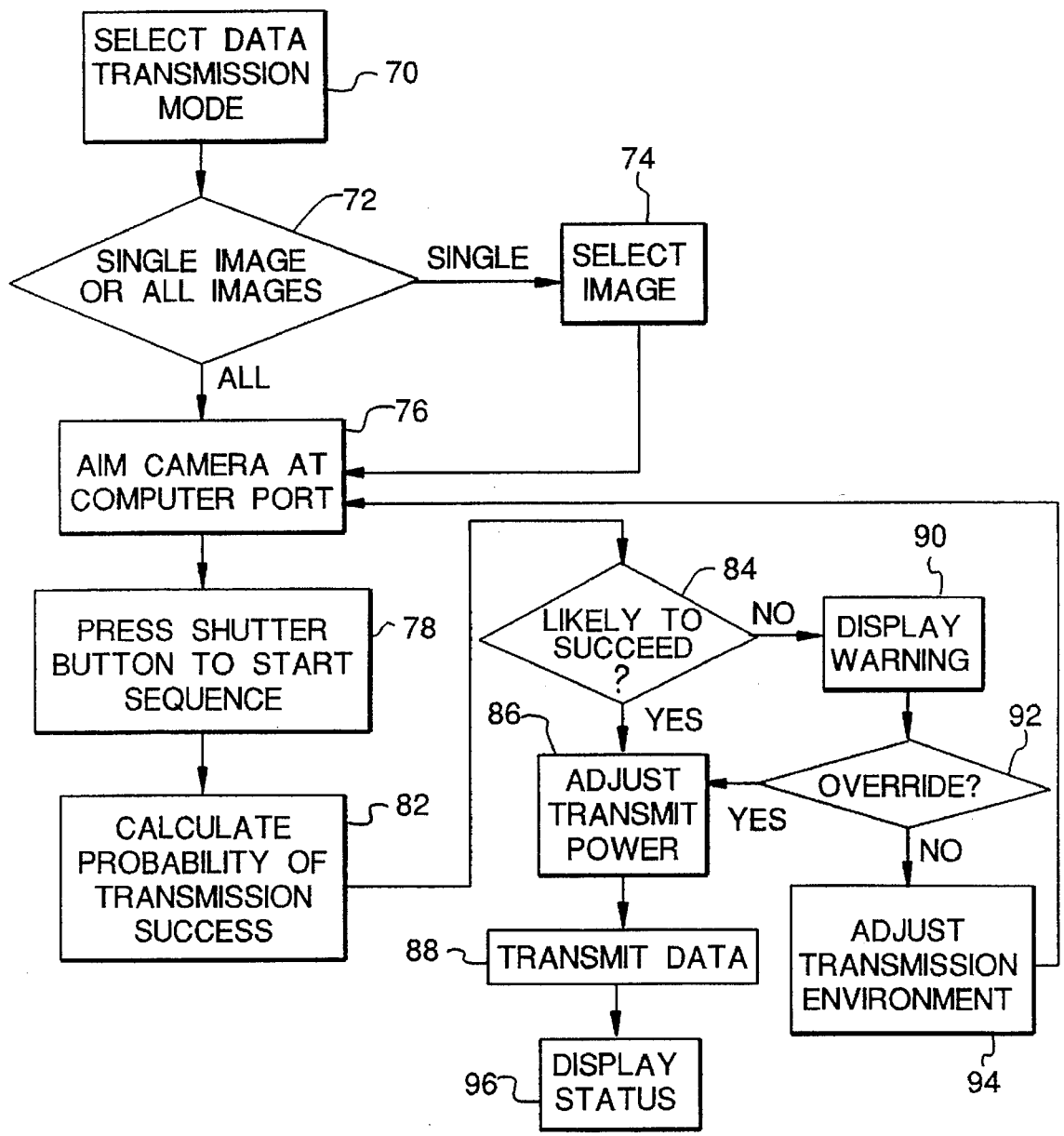
FIG. 5 is a flow chart showing the operation of the camera for transmitting data to the computer in accordance with the present invention.

With reference to FIG. 5, a flow chart is shown of the operation of the camera for transmitting data to the computer in accordance with the present invention. In this flow chart, the operation will be understood to be for the transmission of image data such as pictures which need to be sent from the camera to the computer. Block 70 shows that a user, operating the user mode selector 29 (FIG. 2), selects the data transmission mode of the camera. Blocks 72 and 74 show the operator interacting with display unit 42 and shutter button 27 to select which image data to transfer. After selecting appropriate data to be transferred, the user aims the camera at the computer in block 76 and completely depresses the shutter button in block 78 to start the prediction process. In block 78, CPU 22 causes an auto focus sequence to occur which provides a distance signal correlating to the camera to computer distance. Next, CPU 22 causes light measuring unit 44 to measure the ambient light level. In blocks 82 and 84, CPU 22 then looks at these signals to predict the required power. If the required power for the given transmission environment is within the capability of the available power (see FIG. 4—area 1), CPU 22 causes power control block 38 to begin serial data transmission at the calculated power by driving the auto focus emitter 12 in the prescribed manner.

At the termination of transmission due to either transmission completion or transmission interruption, the transmission status is reported to the operator in block 96 via CPU 22, EEPROM 28, and display unit 42. If the required power is outside the available maximum power level (see FIG. 4—area 2), the CPU causes display 42 to display a warning message as shown in block 90. Blocks 92 and 94 show a user interacting with shutter button 27 and display unit 42 to accept the warning and make the suggested changes to the transmission environment (adjust illumination, for example, light in a room) or override the suggested changes and apply maximum power.

Reviewing, a decision is made in the CPU 22 as to whether to send a single image or all stored images. As shown in block 72, the images for transmission are selected in block 74. Next, the camera is aimed at the computer port in preparation for data transmission. A signal from the emitter 60 in the computer is received by the PSD 18 in the camera which causes the IC 20 to signals the CPU 22 that the camera is in communication with the computer and the CPU 22 camera computes the distance signal. Next, the user presses the shutter button (block 78) to start the transmission sequence as shown in block 76. The CPU 22 produces the control signal in response to information from the PSD 18 and the light measuring unit 44 as discussed above. The control signal is calculated in block 78 and, if the distance is within an appropriate range as determined by the CPU 22, the CPU 22 drives the power controller 38 and the auto focus emitter 12 causing data to be transmitted to the receiving unit Rx of the computer as discussed above. As shown in the flow chart, the CPU 22 actually calculates the probability of transmission success based upon the measured distance of the computer to the camera and ambient light level, as shown in block 82. A decision is then made by the CPU 22 as to whether the transmission of data is likely to be successful. If not, a signal as shown in block 90 is displayed on display unit 42 on the camera telling the user that it is not likely that data can be effectively transmitted to the computer 19. The operator has an opportunity to override the CPU 22 and cause data to be transmitted. In any event, as shown in block 86, if data are to be transmitted, the power levels are adjusted and the data transmitted are shown in block 88. Another block 94 is shown which indicates that the user has an opportunity to change the environment such as light levels in a room or distance to the computer to improve the likelihood of the success of data transmission.

The invention has been described in detail with particular reference to certain preferred embodiments thereof, but it will be understood that variations and modifications can be effected within the spirit and scope of the invention.

Parts List 12 auto focus emitter
14 lens 16 lens
18 PSD
19 computer
20 auto focus control IC
22 central processing unit
24 camera taking lens
25 image memory
26 focusing unit
27 shutter button
29 user mode selector
28 EEPROM
30 high pass filter
32 standard current to voltage converter
34 digitizer
36 OR gate
38 power controller
40 conditioned battery power supply
42 display unit
44 light measuring unit
50 lens
56 infrared receiving sensor
58 signal processing unit
60 emitter
70 block
72 block
74 block
76 block
78 block
82 block
84 block
86 block
88 block
90 block
94 block
96 block

I claim:

1. In a camera having an auto focus system adapted to receive and transmit information from a computer, the improvement comprising:
   a) means for measuring ambient light level and to produce a signal representative of the effect on information transmission from such ambient light level; and
   b) means responsive to the signal for predicting the likelihood of information transmission success.

2. In a camera having an auto focus system adapted to receive and transmit information from a computer, the improvement comprising:
   a) a position sensitive device having at least two current channels producing currents which are a function of the distance of the camera from the computer; and
   b) means for processing current in the channel which contains information being transmitted from the computer to the camera.

3. In a camera having an auto focus system adapted to receive and transmit information from a computer by way of radiation beams, the improvement comprising:
   a) means for measuring ambient light level and to produce a signal representative of the effect on information transmission from such ambient light level;
   b) means responsive to the signal for predicting the likelihood of information transmission success; and
   c) means for adjusting the camera radiation beam as a function of a distance between the camera and the computer.

4. In a camera adapted to receive and transmit information by means of radiation beams to and from a computer and having an auto focus system and including means for providing a radiation beam and radiation beam sensor means and being effective in a first mode for transmitting a radiation beam, reflecting it off of a subject and the beam sensor means being adapted to receive such reflected radiation beam from the subject for effectively determining the subject distance for auto focus of the camera and, in a second mode, after aligning the camera radiation beam with the computer for determining the distance between the camera and the computer and including means for adjusting the intensity of the camera radiation beam as a function of the distance between the camera and the computer and directly communicating data between the camera and the computer.

5. In a camera adapted to receive and transmit information by means of radiation beams to and from a computer and having an auto focus system and including means for providing a radiation beam and radiation beam sensor means and being effective in a first mode for transmitting a radiation beam, reflecting it off of a subject and the beam sensor means being adapted to receive such reflected radiation beam from the subject for effectively determining the subject distance for auto focus of the camera and, in a second mode, after aligning the camera radiation beam with the computer for determining the distance between the camera and the computer and including means for adjusting the intensity of the camera radiation beam including means for providing a signal which is as a function of the distance between the camera and the computer, means for sensing and providing a signal representative of the ambient light level and means responsive to the distance signal and the ambient light level signal for adjusting the intensity of the camera radiation beam which directly communicates data between the camera and the computer.

6. The camera of claim 4 further including a light source which provides the camera radiation beam and wherein the beam sensor means includes a position determining device.

7. A light beam communication system for linking a camera having an auto focus system and a computer, comprising:
   the computer having a first light beam emitter and a first light beam sensor; and
   the camera auto focus system having a second light beam emitter and a light beam sensor array and being effective in a first mode for transmitting the camera light beam and reflecting it off of a subject and the beam sensor means being adapted to receive such reflected light beam from the subject for effectively determining the subject distance for auto focus of the camera and, in a second mode, after aligning the camera light beam with the computer for determining the distance between the camera and the computer and including means for adjusting the intensity of the camera light beam and including means for adjusting the intensity of the camera radiation beam including means for providing a signal which is as a function of the distance between the camera and the computer, means for sensing and providing a signal representative of the ambient light level and means responsive to the distance signal and the ambient light level signal for adjusting the intensity of the camera radiation beam which directly communicates data between the camera and the computer.

8. The communications system of claim 7 further including a light source which provides the camera radiation beam and wherein the beam sensor means includes a position determining device.

9. The communications system of claim 7 including another light source which provides the camera radiation beam.

10. A light beam communication system for linking a camera having an auto focus system and a computer, comprising:

the computer having a first light beam emitter and a first light beam sensor; and the camera auto focus system having a second light beam emitter and a light beam sensor array and being effective in a first mode for transmitting the camera light beam and reflecting it off of a subject and the beam sensor means being adapted to receive such reflected light beam from the subject for effectively determining the subject distance for auto focus of the camera and, in a second mode, after aligning the camera light beam with the computer for determining the distance between the camera and the computer and including means for adjusting the intensity of the camera light beam as a function of the distance between the camera and the computer and directly communicating data between the camera and the computer.

11. The communication system of claim 10 further including a light source which provides the camera radiation beam and wherein the beam sensor means includes a position determining device.

* * * * *